March 22, 1960

R. L. CHOLVIN ET AL 2,929,225

PNEUMATIC ACTUATOR

Filed Jan. 9, 1958

INVENTOR.
ROBERT L. CHOLVIN,
LESLIE S. TERP.
BY
Herschel C. Omohundro
ATTORNEY.

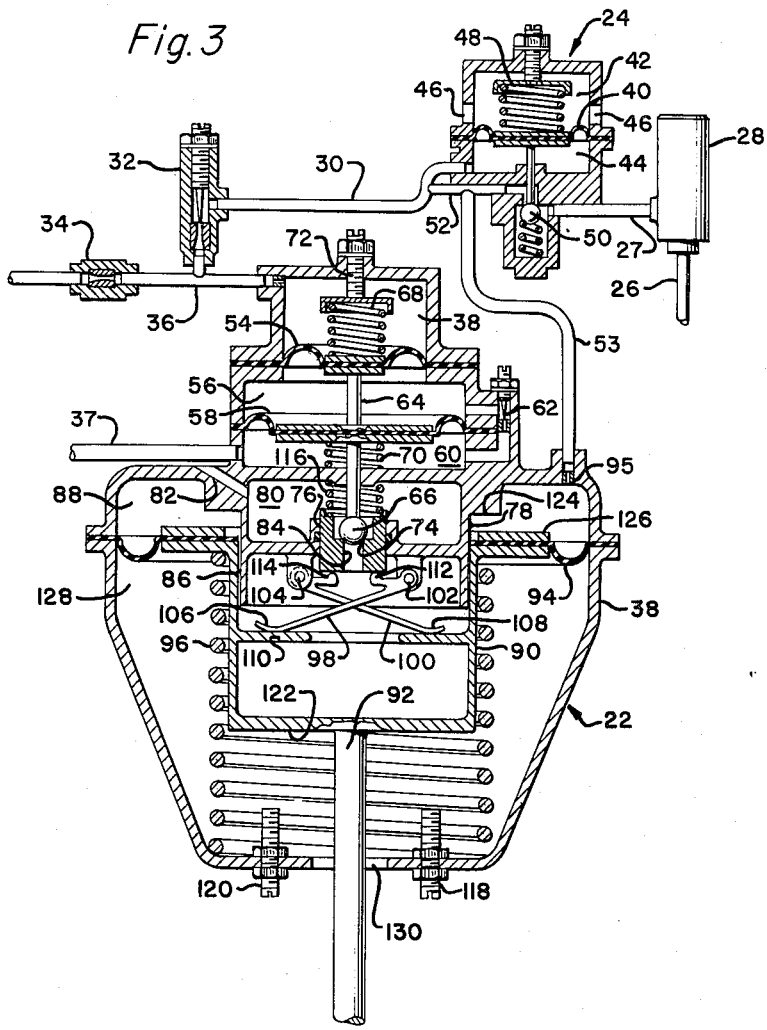

United States Patent Office
2,929,225
Patented Mar. 22, 1960

2,929,225

PNEUMATIC ACTUATOR

Robert L. Cholvin, Hermosa Beach, Calif., and Leslie S. Terp, Scottsdale, Ariz., assignors to The Garrett Corporation, Los Angeles, Calif., a corporation of California Application January 9, 1958, Serial No. 707,938

17 Claims. (Cl. 62—172)

This invention relates to a fluid pressure control system, and more particularly to a system for scheduling the control of fluid pressure in response to altitude changes and according to requirements within an aircraft cabin.

When supplying refrigerated air to an aircraft cabin, it is desirable that such air be delivered to the cabin at a pressure compatible with that maintained by the cabin pressure regulating system throughout a desired range of altitude.

In many aircraft cabin air conditioning systems cooling turbines are used to supply cool air to the cabin, and it has been a problem to regulate the output of a cooling turbine so that fluid pressure downstream thereof substantially corresponds with a desired regulated pressure within the aircraft cabin.

Cooling turbines are generally operated by bleed air from the compressor of an aircraft main engine. The pressure of such bleed air varies greatly in accordance with varying performance conditions of the aircraft. For example, when the aircraft engine is operating under some conditions, the compression ratio of the bleed air is high, and when operating under other conditions, the compression ratio of the bleed air is very low. Such a low compression ratio may be due to engine idle conditions when the aircraft is landing. When the engine is operating at very high altitudes, the engine compressor output pressure may be at a low ratio relative to a desired pressure internally of an aircraft cabin into which a cooling turbine delivers cool air. Accordingly, the cooling turbine must be designed to operate at a low compression ratio so that it will be efficient when compressor output pressure bled from an aircraft engine is at a low ratio relative to a desired output pressure of the cooling turbine. Additionally, the cooling turbine must be provided with a variable area nozzle, so that a low compression ratio may be maintained thereacross when engine compressor output pressure is high.

With the foregoing in mind, it will be appreciated that the output pressure of a cooling turbine must be maintained in accordance with a desired aircraft cabin pressure, and that the fluid pressure at the inlet of the cooling turbine must be properly controlled to maintain a substantially constant predetermined compression ratio across the cooling turbine to secure the most efficient operation.

Accordingly, it is an object of the invention to provide a fluid pressure control system which schedules the control of pressure fluid admitted to an aircraft cabin, whereby the pressure of such fluid substantially corresponds with that maintained in the cabin by the cabin pressure regulator.

Another object of the invention is to provide an altitude-responsive fluid pressure control system which is particularly adapted for use in maintaining a fluid at a predetermined pressure ratio from the inlet to the outlet of a cooling turbine so that most efficient operating conditions for the cooling turbine will be secured.

Another object of the invention is to provide an altitude-responsive fluid pressure control system which is particularly adapted for use in controlling fluid pressure at the inlet of a cooling turbine designed to operate at a low compression ratio, whereby the cooling turbine may be efficiently operated by jet engine bleed air when the compression ratio of such bleed air is either high or low, depending upon performance conditions of the aircraft carrying the jet engine.

Another object of the invention is to provide an altitude-responsive fluid pressure control system which is particularly adapted for use in controlling fluid flow through a cooling turbine, whereby pressure downstream thereof is compatible with that within an aircraft cabin into which the cooled fluid is admitted.

Another object of the invention is to provide a novel fluid pressure control system which includes an altitude-responsive regulating system comprising a pair of orifices in series, one of which is constantly choked and the other of which becomes choked at a predetermined altitude, thereby gradually changing the pressure of fluid delivered to the cabin, said pressure decreasing at a lower rate than ambient atmospheric pressure corresponding with a progressive ascent above said predetermined altitude.

A further object of the invention is to provide a fluid pressure control system comprising a novel combination of a differential pressure regulator, pressure-dividing orifices, and pressure-responsive means for controlling pressure in responsive to altitude changes.

A still further object of the invention is to provide a fluid pressure control system comprising a differential pressure regulator, the output pressure of which is substantially constant with respect to ambient pressure, said output pressure being delivered to a pair of orifices in series, one of which is constantly choked and the other of which becomes choked at a predetermined pressure ratio thereacross which corresponds with a predetermined altitude, whereby a pressure differential between ambient pressure and that between the orifices changes with respect to changes in ambient pressure above said predetermined altitude.

Further objects and advantages of the invention may be apparent from the following specification, appended claims, and accompanying drawings, in which:

Fig. 3 is a diagrammatic sectional view of the control elements of the fluid pressure control system according to the present invention.

Figure 1:
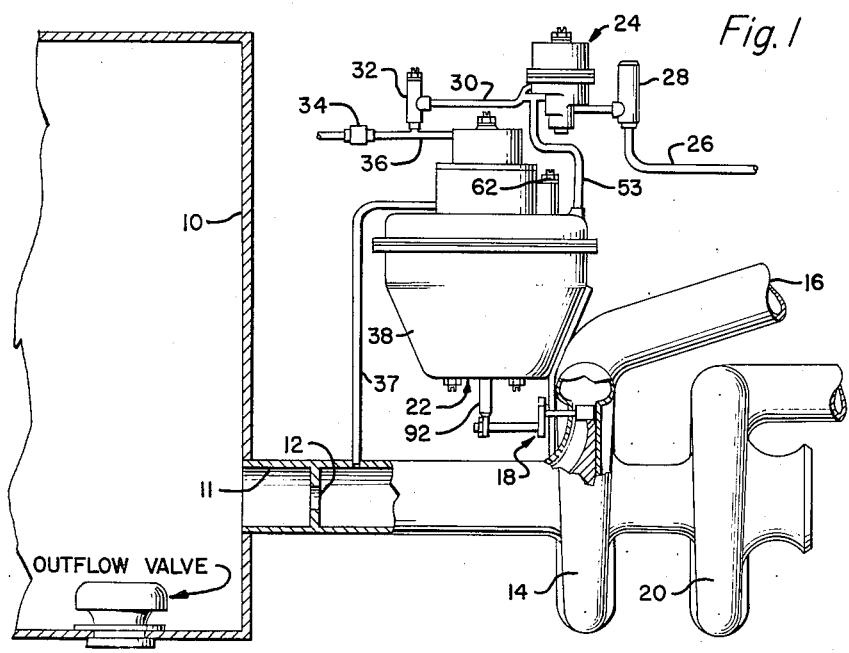
Figure 1 is a diagrammatic view of a fluid pressure control system according to the present invention, showing, fragmentarily and in section, a portion of an aircraft cabin in connection therewith.

As shown in Fig. 1 of the drawings, the present invention is employed to deliver cool air under pressure into an aircraft cabin 10 via a conduit 11 which has a restricted opening 12 therein. Cool air passes through the opening 12 to the cabin 10. Upstream of the restricted opening is a conventional cooling turbine 14 which receives pressure fluid through a conduit 16, the flow of which is controlled by a conventional variable area nozzle mechanism 18 located at the inlet to the turbine.

The cooling turbine 14 is operatively connected with a fan in a housing 20, and thereby extracts energy from the fluid passing through the cooling turbine. The air passing to and from the fan may be employed as desired; for example, such air may be forced across a heat exchanger from which the conduit 16 receives pressure fluid, if desired. The variable area nozzle 18 is adjustable by an actuator 22 in order to control flow through the turbine 14 and pressure upstream of the restricted opening 12, as will be hereinafter described in detail. Controls for the actuator include a differential pressure regulator 24 which receives pressure fluid through a conduit 26 and filter 28. The differential pressure regulator 24 delivers output pressure into a conduit 30, said output pressure being at a constant differential with respect to ambient atmospheric pressure.

The output from pressure regulator 24 passes from the conduit 30 through pressure-dividing orifices 32 and 34 which are disposed in series. The orifice 32 is designed to be choked at all times when the conduit 30 is supplied with a sufficient quantity of air, while the orifice 34 is sized and of a configuration which causes it to become choked when a certain atmospheric pressure, corresponding to a predetermined altitude, exists at the outlet side of the orifice 34 and orifice 32 is choked.

A conduit 37 communicates with the conduit 11 upstream of the restricted opening 12 and downstream of the cooling turbine 14, thereby sensing pressure of fluid at the outlet of the turbine 14.

Communicating with the conduit 30 between orifices 32 and 34 is a conduit 36, which conducts fluid at the control pressure existing between the orifices into a housing 38 of the actuator 22. Said control pressure is employed as a reference relative to fluid pressure in the conduit 37 in order to control working pressure in the actuator 22 in response to altitude changes and according to the internal pressure requirements of an aircraft cabin. The actuator 22 is supplied with working pressure fluid through a conduit 53, which receives fluid at regulated pressure from the conduit 52, as will be hereinafter described in detail.

It is usual practice to maintain fluid pressure within an aircraft cabin at a constant differential with respect to ambient atmospheric pressure up to a predetermined altitude. Then, as the altitude is increased and the atmospheric pressure decreases, the pressure internally of the cabin is decreased at a lower rate than ambient pressure. Thus, a compromise is made between a pressure differential which the structure of the aircraft can stand and fluid pressure internally of the cabin in order to maintain comfort of passengers therein.

A differential between pressure within the cabin and ambient atmospheric pressure is limited by means of a conventional cabin pressure regulator, which is no part of the present invention. Pressure of fluid delivered from the cooling turbine 14 is maintained at a value compatible with that maintained by the cabin pressure regulator. However, the fluid pressure control system of the present invention is not under control of the cabin pressure regulator, since it tends to schedule fluid pressure at a value slightly above that maintained by the cabin pressure regulator.

Referring now to details of the fluid pressure control system shown in Fig. 3, it will be seen that the differential pressure regulator 24 is provided with a diaphragm 40, which is located between chambers 42 and 44. Openings 46 in the housing of the regulator admit ambient atmospheric pressure to the chamber 42 at one side of the diaphragm 40, which is engaged by a spring 48 tending to move the diaphragm toward the chamber 44. Connected to the diaphragm 40 is a pressure-regulating valve 50 which receives pressure fluid from the filter 28 via a conduit 27. Fluid flows from the pressure-regulating valve 50 through a conduit 52, which communicates with the chamber 44 to which one side of the diaphragm 40 is exposed, the opposite side being exposed to the chamber 42, whereby fluid pressure downstream of the regulating valve 50 opposes force of the spring 48 and ambient pressure on the diaphragm 40. Pressure of fluid in the chamber 44 is thus regulated to maintain a constant differential relative to ambient atmospheric pressure, it being noted that the spring 48 acting on the diaphragm 40 establishes the differential between output pressure of the regulating valve 50 and that of ambient pressure. This differential is shown graphically in Fig. 2 of the drawings, wherein the regulator output pressure and ambient pressure are at a constant differential throughout any selected range of altitude.

The conduits 52 and 30 deliver regulated pressure to the adjustable pressure-dividing orifice 32, the configuration of which has been designed to maintain sonic flow therethrough. Thus, this orifice is at all times operated in choked condition. The orifice 34 receives pressure fluid from the orifice 32, but is of a configuration and size calculated to cause it to maintain subsonic flow therethrough when operated below a predetermined altitude and become choked at the predetermined altitude, due to a change in pressure ratio thereacross. The orifice remains choked when operated above such altitude. It will be understood that fluid pressure between the orifices 32 and 34 will thus be maintained at a susbtantially constant differential with respect to ambient atmospheric pressure up to the predetermined altitude at which the pressure ratio causes the orifice 34 to become choked or to operate at a sonic flow condition therethrough.

Figure 2:
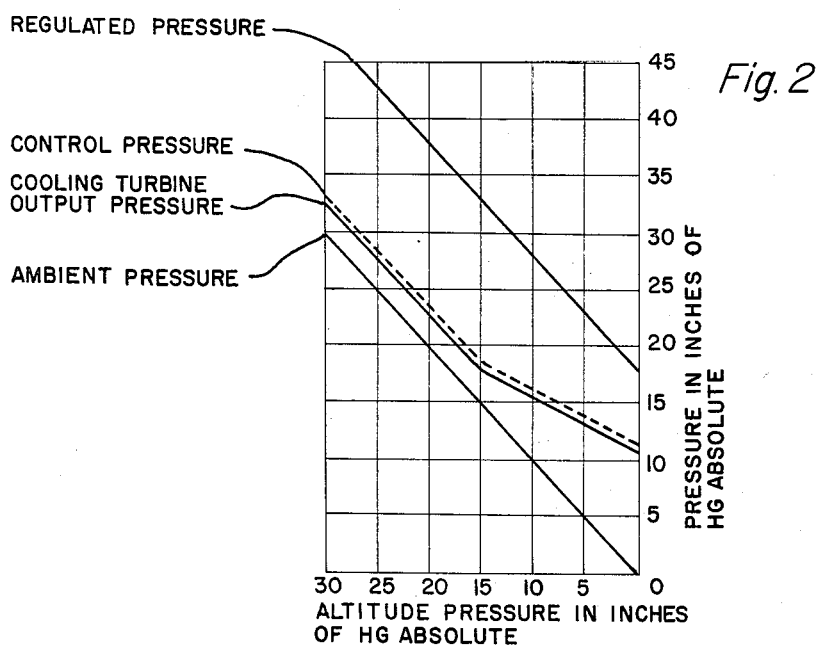
Fig. 2 is a graphic illustration of fluid pressures maintained by the system relative to ambient atmospheric pressure throughout a predetermined range of altitude.

As shown in Fig. 2 of the drawings, a substantially constant differential is maintained between ambient pressure and control pressure existing between the orifices 32 and 34 up to a predetermined altitude at which ambient pressure equals 15 inches of mercury. At this altitude, the pressure ratio across the orifice 34 becomes critical, and it becomes choked. As shown in Fig. 2, the differential between control pressure and ambient pressure gradually increases with further increases of altitude.

Following are comparative values of pressures and corresponding ratios relating to the operation of the present invention at various altitudes. All of the pressures are expressed in inches of mercury.

| Altitude, Approx. Ft. | Ambient Pressure, Inches of Hg Absolute | Control Pressure, Inches of Hg Absolute | Turbine Output Pressure, Inches of Hg Absolute | Ratio of Control Pressure to Ambient Pressure | Pressure Differ'l., Control Pressure to Ambient Pressure, Inches of Hg |
|---|---|---|---|---|---|
| S.L. | 29.92 | 32.42 | 32.42 | 1.08:1 | 2.5 |
| 5,000 | 25 | 27.5 | 27.5 | 1.1:1 | 2.5 |
| 10,000 | 20 | 22.5 | 22.5 | 1.125:1 | 2.5 |
| 17,500 | 15 | 17.5 | 17.5 | 1.17:1 | 2.5 |
| 27,500 | 10 | 16. | 16. | 1.6:1 | 6. |
| 42,000 | 5 | 13.5 | 13.5 | 2.7:1 | 8.5 |

From the foregoing figures it will be seen that the ratio of control pressure to ambient pressure gradually changes up to a predetermined altitude of approximately 17,500 feet, at which ambient pressure is equal to 15 inches of mercury, whereupon the orifice 34 becomes choked. This orifice is shaped and sized so that it becomes choked at a pressure ratio of 1.17:1. It will be seen that the pressure differential between control pressure and ambient pressure increases above said predetermined altitude.

The foregoing schedule of control pressure relative to ambient pressure is arranged to correspond with the usual cabin pressure control functions, and it will be here noted that the orifice 34 may be designed to choke at different ratios which may correspond with other desired altitudes. For example, 15 inches of mercury may correspond to substantially 17,500 feet, and it may be desirable to design the orifice to become choked at a pressure ratio corresponding with 13,500 feet. Therefore, the predetermined altitude at which the orifice 34 becomes choked may be a matter of choice and within the skill of an artisan, who may design the pressure dividers 32 and 34 to change the pressure differential between control pressure and ambient pressure at other desired altitudes.

When an altitude is reached at which the orifice 34 becomes choked, further reductions in ambient pressure downstream of this orifice, resulting from increasing altitude, do not affect flow through the orifice 34. However, output absolute pressure of the differential pressure regulator is gradually reduced in response to increases of altitude, since the differential pressure regulator maintains a constant pressure differential with respect to ambient pressure throughout a range of altitude. Since output pressure of the pressure differential regulator decreases, density of the pressure fluid at the inlet of the choked orifice 32 is correspondingly reduced. This reduction of density effects a corresponding reduction of weight flow through the orifice 32 which reduces control pressure between the orifices 32 and 34, since a choked condition of the orifice 34 above a predetermined altitude limits its flow capacity with a given air pressure and temperature. Inasmuch as weight flow through the orifice 32 decreases corresponding to increase in altitude, pressure upstream of the orifice 34 is decreased, and, consequently, weight flow therethrough is decreased. Due to this reduction of weight flow, control pressure between the orifices 32 and 34 is reduced at a lower rate than the reduction in ambient pressure resulting from increases in altitude. From the foregoing, it will be recognized that when the present invention is operated above a predetermined altitude at which the orifice 34 becomes choked, the pressure-dividing orifices 32 and 34 cooperate, according to decreasing pressure delivered by the differential pressure regulator 24, to attain a scheduled reduction of control pressure at a rate lower than a corresponding reduction of ambient pressure occasioned by an ascent above said predetermined altitude.

The rate at which control pressure changes under the foregoing conditions depends upon the relative sizes and configurations of the orifices 32 and 34, which, according to the present invention, may be formed in the shape of nozzles to attain choked conditions thereof at low pressure ratios thereacross.

Control pressure existing in the conduit 36 is conducted into the chamber 38, which is closed at one side by a diaphragm 54. This diaphragm 54 also closes one side of a chamber 56, the opposite side of which is closed by a diaphragm 58. The diaphragm 58 also closes one side of a chamber 60 with which the conduit 37 communicates. The chambers 56 and 60 at opposite sides of the diaphragm 58 communicate via an adjustable orifice 62, which controls the rate at which the diaphragm 58 may respond to a change of pressure in the conduit 11 upstream of the orifice 12, as will be hereinafter described in detail.

The diaphragms 54 and 58 are connected for movement together by a rod 64 having a spherical pilot valve element 66 at one end thereof. An initial position of the pilot valve element 66 is maintained by springs 68 and 70 located in the chambers 38 and 60, respectively. These springs engage the diaphragms 54 and 58, respectively, and exert equal and opposite forces thereupon. The springs 68 and 70 are adjustable by means of a screw 72 in order to provide for the initial positioning of the pilot valve element 66 during calibration of the present fluid pressure control system.

The pilot valve element 66 cooperates with a pilot valve seat 74, which is formed on a hollow cylindrical member movably mounted in a bore 76 disposed concentrically of a cylindrical extension 78 of the actuator housing 38. The pilot valve element 66 communicates via a chamber 80 and a vent passage 82 with ambient pressure. A bore 84 in the pilot valve seat element 74 communicates via an annulus 86 with a working pressure chamber 88. The annulus 86 is formed by clearance between the exterior of the cylindrical extension 78 of the housing 38 and the interior of a cylindrical member 90, which connects the actuator rod 92 and a diaphragm 94 closing one side of the working pressure chamber 88. This working pressure chamber receives pressure fluid through an orifice 95 communicating with a conduit 53 wherein regulated pressure is received from the differential pressure regulator 24.

Working pressure in the chamber 88 is regulated by the pilot valve 66, and force of this working pressure is opposed by force of a spring 96, which tends to move the diaphragm 94 toward the working pressure chamber 88. The pilot valve 66 is a modulating valve, and, when slightly open, permits pressure fluid to bleed from the chamber 88 downstream of the orifice 95 via the annulus 86, bore 84, chamber 80, and ambient vent passage 82. Thus, movement of the pilot valve element 66 toward an open position tends to reduce pressure in the chamber 88, while movement of the pilot valve element 66 toward a closed position tends to increase fluid pressure in the chamber 88. Thus, the diaphragm 94 is caused to follow the pilot valve element 66.

Due to limited axial movement of the pilot valve element 66, levers 98 and 100 are provided to permit a relatively greater axial movement of the actuator rod 92 than corresponding movement of the pilot valve element 66. The levers 98 and 100 are mounted on fulcrums 102 and 104, respectively, which are supported on the cylindrical element 78 of the actuator housing 38.

Ends 106 and 108 of the respective levers 98 and 100 bear on a shelf 110 of the cylindrical element 90. Opposite ends 112 and 114 of the levers 98 and 100 bear upon one end of the pilot valve seat element 74. The ratio of the levers 98 and 100 may be suitable, for example, substantially 4:1, as shown, so that the actuator 22 may move four times as far, in the same direction, as the pilot valve seat element 74. Thus, the levers 98 and 100 act as motion amplifying devices with respect to operation of the actuator 22 and pilot valve element 66. A spring 116 is disposed to maintain the pilot valve seat 74 in engagement with the ends 112 and 114 of the levers 98 and 100, so that the pilot valve seat element 74 will be forced to move in the bore 76 and follow the ends 112 and 114 of the levers.

Stop screws 118 and 120 are disposed in the end of the actuator housing 38, and may be engaged by an end 122 of the cylindrical member 90 when the actuator 22 has reached its maximum extended position, which corresponds with a fully open position of the variable area nozzles 18 of the cooling turbine 14. An annular ledge 124 in the housing 38 forms a stop for a plate 126, employed to clamp the diaphragm 94 to the member 90, when the actuator is in its fully retracted position corresponding to a closed position of the variable area nozzles 18 at the inlet of the cooling turbine 14.

A chamber 128 at the opposite side of the diaphragm 94 from the chamber 88 is vented via an opening 130, to the ambient atmosphere.

Operation of the fluid pressure control system in accordance with the present invention is substantially as follows: When the cooling turbine is operated to supply cool air to the cabin 10, the variable area nozzle 18 is modulated to maintain a desired schedule of fluid pressure at the inlet of the cooling turbine and in the duct 11 upstream of the orifice 12, in accordance with requirements within the aircraft cabin 10 at various altitudes. Fluid pressure at the inlet of the cooling turbine is maintained at a substantially constant ratio with respect to fluid pressure in the duct 11. Thus, the turbine operates at a predetermined pressure ratio which is most efficient relative to configuration of the turbine blading.

It is desirable to maintain fluid pressure at the outlet of the turbine 14 slightly above pressure in the cabin 10 as controlled by a conventional cabin pressure regulator. As hereinbefore described, the differential pressure regulator 24 and pressure-dividing orifices 32 and 34, in accordance with a predetermined range of altitude, maintain a schedule of control fluid pressure in the chamber 38 in correspondence with a cabin air pressure schedule, Fluid pressure in the duct 11 is utilized in opposition to control pressure in the chamber 38 across the diaphragm 54 to control the pilot valve 66 and, consequently, the variable area nozzle actuator 22.

When fluid pressure changes in the conduit 16 at the inlet of the turbine 14, pressure at the outlet of the turbine 14 in the duct 11 tends to change, whereupon this tendency to change is reflected via the tube 37 in the chamber 60 at one side of the diaphragm 58.

This diaphragm 58 is substantially larger than the diaphragm 54 and tends initially to provide for a high gain in control response of the pilot valve 66 due to restricted flow through the orifice 62, whereby a high initial pressure differential is created across the diaphragm 58. This high gain in control response is followed by equalization of pressure across the diaphragm 58 through the rate control orifice 62, whereby normal positioning of the pilot valve element 66 is obtained according to a balance of control pressure in the chamber 38 with turbine outlet pressure existing in the chamber 56.

It will be here noted that during equalization of a fluid pressure change across the diaphragm 58, a pressure differential change occurs across the diaphragm 54, due to a change of pressure in the chamber 56. Thus, the diaphragm 58 and orifice 62 function to provide a rapid gain in pilot valve response, while the diaphragm 54 serves as a normal pilot valve controlling element.

The springs 68 and 70 oppose each other and their forces are substantially balanced, so that the pilot valve 66 tends to maintain a position of the actuator 22 to regulate pressure in the duct 11 equal to control pressure in the chamber 38. With reference to Fig. 2 of the drawings, it will be seen that the broken line illustrating control pressure is contiguous with the solid line illustrating turbine output pressure. It will also be seen that there is a pressure differential of substantially 2½ inches of mercury between turbine outlet pressure and ambient pressure throughout a range of altitude from sea level to a predetermined altitude at which ambient pressure equals substantially 15 inches of mercury. This pressure differential is maintained by reason of a pressure drop across the orifice 34, which, during this range of altitude, functions in a non-critical or subsonic manner.

At said predetermined altitude, it will be seen that the orifice 34 becomes choked and operates as hereinbefore described to change the pressure differential schedule between ambient pressure and turbine outlet pressure, in accordance with requirements internally of the aircraft cabin and pressure maintained therein by a conventional cabin pressure regulator.

When turbine outlet pressure in the duct 11 exceeds a predetermined value, an increase of such pressure is sensed in the chamber 60 and acts upon the diaphragm 58, thereby moving the pilot valve element 66 toward an open position relative to the pilot valve seat 74. This action increases the venting of pressure fluid from the chamber 88, thereby reducing fluid pressure therein. Accordingly, the spring 96 forces the diaphragm 94 of actuator 22 toward a closed position of the turbine inlet nozzles to thereby reduce pressure in the duct 11. Action of the spring 96 also causes the levers 112 and 114 to move the seat 74 toward the pilot valve element 66. This action, however, moves the seat 74 substantially only one-fourth of the distance traversed by the actuator 22, since the leverage ratio of the levers 98 and 100 is substantially 4:1, as hereinbefore described. This arrangement permits a long stroke of the actuator while it follows a relatively short stroke of the pilot valve element 66.

In the event a reduction of fluid pressure takes place in the duct 11, the opposite action occurs, which causes the actuator 22 to move the variable area nozzles toward an open position in order to increase fluid pressure downstream thereof.

It will be obvious to those skilled in the art that various modifications of the present invention may be resorted to in a manner limited only by a just interpretation of the following claims.

We claim:

1. In a pneumatic fluid pressure control system, the combination of: a first means disposed to receive pressure fluid from a source thereof; a second means operative to control pressure of fluid passing from the source to said first means, said second means comprising a differential pressure regulator disposed to receive pressure fluid and discharge it at a constant differential with respect to ambient pressure; first and second orifices connected in series with each other, said first orifice being disposed to receive pressure fluid delivered by said differential pressure regulator, said second orifice receiving pressure fluid from said first orifice and exhausting to ambient atmosphere; a third means having a first surface responsive to fluid pressure existing between said orifices and a second surface opposed to said first surface; and a fourth means providing communication between said first means and said second surface, whereby fluid force from said first means acts on said second surface of said third means in opposition to force exerted on said first surface thereof by pressure of fluid existing between said orifices, said third means responding to a differential between fluid pressure in said first means and that existing between said orifices to operate said second means and control pressure of fluid in said first means.

2. In a pneumatic fluid pressure control system, the combination of: a first means disposed to receive pressure fluid from a source thereof; a second means operative to control pressure of fluid passing from the source to said first means, said second means comprising a differential pressure regulator disposed to receive pressure fluid from the source and discharge it at a constant differential with respect to ambient pressure; first and second orifices connected in series with each other, said first orifice being disposed to receive pressure fluid delivered by said differential pressure regulator, said second orifice receiving pressure fluid from said first orifice and exhausting to ambient atmosphere; a third means having a first surface responsive to fluid pressure existing between said orifices and a second surface opposed to said first surface; a fourth means providing communication between said first means and said second surface, whereby fluid force from said first means acts on said second surface of said third means in opposition to force exerted on said first surface thereof by pressure of fluid existing between said orifices, said third means responding to a differential between fluid pressure in said first means and that existing between said orifices; a pilot valve disposed for operation by said third means; and a fifth means responsive to fluid pressure controlled by said pilot valve, said fifth means being disposed to modulate the passage of pressure fluid from said source to said first means.

3. In a pneumatic fluid pressure control system, the combination of: a first means disposed to receive pressure fluid from a source thereof; a second means operative to control pressure of fluid passing from the source to said first means, said second means comprising a differential pressure regulator disposed to receive pressure fluid from the source and discharge it at a constant differential with respect to ambient pressure; first and second orifices connected in series with each other, said first orifice being disposed to receive pressure fluid delivered by said differential pressure regulator, said second orifice receiving pressure fluid from said first orifice and exhausting to ambient atmosphere; a third means having a first surface responsive to fluid pressure existing between said orifices and a second surface opposed to said first surface; a fourth means providing communication between said first means and said second surface, whereby fluid force from said first means acts on the second surface of said third means in opposition to force exerted on the first surface thereof by pressure of fluid existing between said orifices, said third means responding to a differential between fluid pressure in said first means and that existing between said orifices; a pilot valve operable by said third means; and a fifth means responsive to fluid pressure controlled by said pilot valve, said fifth means being disposed to modulate the passage of pressure fluid from said source to said first means, and including a cooling turbine having a variable area nozzle located to control the flow of fluid from said source through said turbine and into said first means.

4. In a pneumatic fluid pressure control system, the combination of: a first means disposed to receive pressure fluid from a source thereof; a second means disposed to control pressure of fluid passing from the source to said first means, said second means comprising a differential pressure regulator disposed to receive pressure fluid and discharge it at a constant differential with respect to ambient pressure; first and second orifices connected in series with each other, said first orifice being choked by a pressure fluid delivered by said differential pressure regulator, said second orifice receiving pressure fluid from said first orifice and exhausting to the ambient atmosphere; a third means having a first surface responsive to fluid pressure existing between said orifices and a second surface opposed to said first surface; and a fourth means providing communication between said first means and said second surface, whereby the force of fluid pressure from said first means acts on the second surface of said third means in opposition to force exerted on said first surface thereof by pressure of fluid existing between said orifices, said third means responding to a differential between fluid pressure in said first means and that existing between said orifices to effect control of said second means, said second orifice having a configuration and capacity which causes it to become choked in response to a presure ratio existing between ambient pressure and that between said orifices at a predetermined altitude, whereby fluid pressure in said first means is maintained at a constant differential relative to ambient pressure up to the predetermined altitude at which said second orifice becomes choked, the pressure existing between said orifices gradually decreasing at a lower rate than ambient pressure corresponding with further increases in altitude.

5. In a pneumatic fluid pressure control system, the combination of: a first means disposed to receive pressure fluid from a source thereof; a second means disposed to control pressure of fluid passing from the source to said first means, said second means comprising a differential pressure regulator disposed to receive pressure fluid and discharge it at a constant differential with respect to ambient pressure; first and second orifices connected in series with each other, said first orifice being disposed to receive pressure fluid delivered by said differential pressure regulator, said second orifice communicating with said first orifice and ambient atmosphere; a first diaphragm; a first chamber at one side of said first diaphragm and communicating with pressure fluid between said first and second orifices; a seond diaphragm spaced from said first diaphragm and connected thereto; a second chamber between said diaphragms; a third chamber at the opposite side of said second diaphragm from said second chamber, said third chamber communicating with said first means; a third orifice disposed to provide restricted communication between said second and third chambers; and a pilot valve connected to said diaphragms for controlling the operation of said second means.

6. In a pneumatic fluid pressure control system, the combination of: a first means disposed to receive pressure fluid from a source thereof; a second means disposed to control pressure of fluid passing from the source to said first means, said second means comprising a differential pressure regulator disposed to receive pressure fluid and discharge it at a constant differential with respect to ambient pressure; first and second orifices connected in series with each other, said first orifice being disposed to receive pressure fluid delivered by said differential pressure regulator, said second orifice communicating with said first orifice and ambient atmosphere; a first diaphragm; a first chamber at one side of said first diaphragm and communicating with pressure fluid between said first and second orifices; a second diaphragm spaced from said first diaphragm and connected thereto; a second chamber between said diaphragms; a third chamber at the opposite side of said second diaphragm from said second chamber, said third chamber communicating with said first means; a third orifice disposed to provide restricted communication between said second and third chambers; and a pilot valve connected to said diaphragms for controlling the operation of said second means, said second diaphragm having greater area than said first diaphragm and being operable initially in response to a change of pressure in said first means to provide a high gain in control action of said pilot valve relative to a pressure differential acting on said first diaphragm, whereupon said third orifice subsequently equalizes pressure in said second and third chambers at opposite sides of said second diaphragm.

7. In a pneumatic fluid pressure control system, the combination of: a first means disposed to receive pressure fluid from a source thereof; a second means disposed to control pressure of fluid passing from the source to said first means, said second means comprising a differential pressure regulator disposed to receive pressure fluid from a source and discharge it at a constant differential with respect to ambient pressure; first and second orifices connected in series with each other, said first orifice being disposed to receive pressure fluid delivered by said differential pressure regulator, said second orifice communicating with said first orifice and ambient atmosphere; a third means having a first surface responsive to fluid pressure existing between said orifices and a second surface opposed to said first surface; a fourth means providing communication between said first means and said second surface, whereby fluid force from said first means acts on the second surface of said third means in opposition to force exerted on the first surface thereof by the force of pressure fluid existing between said orifices, said third means responding to a differential between fluid pressure in said first means and that existing between said orifices; a pilot valve having first and second valve elements, said first valve element being operable by said third means; an actuator responsive to fluid pressure controlled by said pilot valve and disposed to actuate said second valve element of said pilot valve; and spring means tending to force said actuator in a direction to follow said first pilot valve element.

8. In a pneumatic fluid pressure control system, the combination of: a first means disposed to receive pressure fluid from a source thereof; a second means disposed to control pressure of fluid passing from said source to said first means, said second means comprising a differential pressure regulator disposed to receive pressure fluid from a source and discharge it at a constant differential with respect to ambient pressure; first and second orifices connected in series with each other, said first orifice being disposed to receive pressure fluid delivered by said differential pressure regulator, said second orifice communicating with said first orifice and ambient atmosphere; a third means having a first surface responsive to fluid pressure existing between said orifices and a second surface opposed to said first surface; a fourth means providing communication between said first means and said second surface, fluid force from said first means acting on the second surface of said third means in opposition to force exerted on the first surface thereof by force of the fluid pressure existing between said orifices, said third means responding to a differential between fluid pressure in said first means and that existing between said orifices; pilot valve means having first and second valve elements, said first valve element being operable by said third means; an actuator responsive to fluid pressure controlled by said pilot valve and disposed to move the second valve element of said pilot valve in the direction of movement of the actuator; a spring tending to force said actuator in a direction to follow said first pilot valve element; and a cooling turbine having a variable area nozzle operable by said actuator and disposed to control flow from said source to said first means.

9. In a pneumatic fluid pressure control system, the combination of: a first means disposed to receive pressure fluid from a source thereof; a second means disposed to control pressure of fluid passing from said source to said first means, said second means comprising a differential pressure regulator disposed to receive pressure fluid from a source and discharge it at a constant differential with respect to ambient pressure; first and second orifices connected in series with each other, said first orifice being disposed to receive pressure fluid delivered by said differential pressure regulator, said second orifice communicating with said first orifice and ambient atmosphere; a third means having a first surface responsive to fluid pressure existing between said orifices and a second surface opposed to said first surface; a fourth means providing communication between said first means and said second surface, fluid force from said first means acting on the second surface of said third means in opposition to force exerted on the first surface thereof by pressure fluid existing between said orifices, said third means responding to a differential between fluid pressure in said first means and that existing between said orifices; a pilot valve having first and second valve elements, said first valve element being operable by said third means; an actuator responsive to fluid pressure controlled by said pilot valve and disposed to cause the second element of said pilot valve to follow said first element thereof; a spring tending to force said actuator in a direction to follow said first pilot valve element; and lever means supported on stationary fulcrum means, said lever means being movable by said actuator and engageable with said second pilot valve element, the ratio of said lever means being such that the second pilot valve element is moved in the same direction as said actuator but a relatively shorter distance.

10. Apparatus for controlling fluid pressure comprising an element disposed for movement in a passage to control fluid flow therethrough; actuating means for said element, said actuating means having a first fluid pressure responsive member operatively connected with said element; a first means for applying fluid under pressure to said first fluid pressure responsive member; a second means for varying the pressure of fluid applied to said first fluid pressure responsive member, said second means having a pilot valve; a pressure regulator receiving fluid from a pressure source and discharging the same under a predetermined differential relative to atmospheric pressure; a third means forming a first orifice communicating with said pressure regulator to receive fluid at regulated pressure therefrom; a fourth means forming a second orifice connected in series with said first orifice and discharging to ambient atmosphere, said first orifice being shaped and sized to be choked at all times, said second orifice being shaped and sized to be choked only when the ambient atmospheric pressure is below a predetermined value; and a second fluid pressure responsive member operatively engaged with said pilot valve, said second fluid pressure responsive member being responsive to differentials between the fluid pressure existing between the first and second orifices and that at the outlet side of said flow controlling element.

11. Apparatus for controlling fluid pressure comprising an element disposed for movement in a passage to control fluid flow therethrough; actuating means for said element, said actuating means having a first fluid pressure responsive member operatively connected with said element; a first means for applying fluid under pressure to said first fluid pressure responsive member; a second means for varying the pressure of fluid applied to said first fluid pressure responsive member, said second means having a pilot valve; a pressure regulator receiving fluid from a pressure source and discharging the same under a predetermined differential relative to atmospheric pressure; a third means forming a first orifice communicating with said pressure regulator to receive fluid at regulated pressure therefrom; a fourth means forming a second orifice connected in series with said first orifice and discharging to ambient atmosphere, said first orifice being shaped and sized to be choked at all times, said second orifice being shaped and sized to be choked only when the ambient atmospheric pressure is below a predetermined value; a second fluid pressure responsive member operatively engaged with said pilot valve, said second fluid pressure responsive member being responsive to differentials between the fluid pressure existing between the first and second orifices and that at the outlet side of said flow controlling element; and means operatively disposed relative to said second fluid pressure responsive means for temporarily increasing the effectivity of the pressure at the outlet side of said flow controlling element.

12. In a pneumatic fluid pressure control system, the combination of: a first means formed to receive pressure fluid from a source thereof, said first means being operative to change a characteristic of the fluid and deliver the same to a predetermined location; adjustable means for controlling the admission of pressure fluid from the source to said first means; a third means operatively related to said adjustable means for operating the same according to a schedule determined by the differences in the fluid pressure between said first means and said predetermined location and a control pressure bearing a fixed differential relative to ambient pressure up to a predetermined altitude and a varying differential relative to ambient pressure above such predetermined altitude, said third means having a differential pressure regulator using atmospheric pressure as a reference for delivering a control pressure and means effective after said predetermined altitude is reached to limit changes in the control pressure delivered by said differential pressure regulator.

13. In a pneumatic fluid pressure control system, the combination of: a first means formed to receive pressure fluid from a source thereof, said first means being operative to change a characteristic of the fluid and deliver the same to a predetermined location; adjustable means for controlling the admission of pressure fluid from the source to said first means; a third means operatively related to said adjustable means for operating the same according to a schedule determined by the differences in the fluid pressure between said first means and said predetermined location and a control pressure bearing a fixed differential relative to ambient pressure up to a predetermined altitude and an increasing differential relative to ambient pressure as altitude is increased above such predetermined altitude, said third means having a differential pressure regulator using atmospheric pressure as a reference for delivering the control pressure and a plurality of sonic nozzles effective after such predetermined altitude is reached to limit change in the control pressure delivered by said differential pressure regulator.

14. In a pneumatic fluid pressure control system of the type having a passage to receive pressure fluid from a source and an adjustable flow control means in such passage: actuator means for the adjustable flow control means comprising a pressure responsive member operatively related to the adjustable flow control means; means for applying fluid pressure to said member according to a schedule determined by the differences in fluid pressures in the passage at the downstream side of the flow control means and a control pressure bearing a fixed differential relative to atmospheric pressure up to a predetermined altitude and a varying differential relative to atmospheric pressure above such predetermined altitude, said means having a differential pressure regulator using atmospheric pressure as a reference for delivering a control pressure and means effective after said predetermined altitude is reached to limit changes in the control pressure delivered by said differential pressure regulator.

15. In a pneumatic fluid pressure control system of the type having a passage to receive pressure fluid from a source and an adjustable flow control means in such passage: actuator means for the adjustable flow control means comprising a pressure responsive member operatively related to the adjustable flow control means; means for applying fluid pressure to said member according to a schedule determined by the differences in fluid pressures in the passage at the downstream side of the flow control means and a control pressure bearing a fixed differential relative to atmospheric pressure up to a predetermined altitude and a varying differential relative to atmospheric pressure above such predetermined altitude, said means having a differential pressure regulator using atmospheric pressure as a reference and a pair of sonic nozzles in series between the regulator outlet and the atmosphere for developing a control pressure, the sonic nozzle discharging to the atmosphere being designed to become choked at said predetermined altitude.

16. In a pneumatic fluid pressure control system of the type having a passage to receive pressure fluid from a source and an adjustable flow control means in such passage: actuating means for said adjustable flow control means comprising a casing forming a chamber; a fluid pressure responsive wall in said chamber, said wall being operatively related to the adjustable flow control means; means including a differential pressure regulator using atmospheric pressure as a reference for supplying fluid pressure to said casing for application to said fluid pressure responsive wall; means for controlling the application of fluid pressure to said wall, said means having a pilot valve; pressure responsive means for actuating said pilot valve; means for applying fluid pressure from the passage at the downstream side of the flow control means to one portion of said pressure responsive means and a control pressure from said differential pressure regulator to another portion of said pressure responsive means; and means operative when atmospheric pressure falls below a predetermined value to limit change in the control pressure delivered by said differential pressure regulator.

17. In a pneumatic fluid pressure control system of the type having a passage to receive pressure fluid from a source and an adjustable flow control means in such passage: actuating means for said adjustable flow control means comprising a casing forming a chamber; a fluid pressure responsive wall in said chamber, said wall being operatively related to the adjustable flow control means; means including a differential pressure regulator using atmospheric pressure as a reference for supplying fluid pressure to said casing for application to said fluid pressure responsive wall; means for controlling the application of fluid pressure to said wall, said means having a pilot valve with a plurality of relatively movable parts; pressure responsive means for actuating one part of said pilot valve, another part of said pilot valve being actuated by said fluid pressure responsive wall; means for applying fluid pressure from the passage at the downstream side of the flow control means to one portion of said pressure responsive means; means for applying a control pressure to an opposed portion of said pressure responsive means, said control pressure applying means having a serially arranged set of sonic nozzles through which flow from said differential pressure regulator is passed; and means for adjusting one of said sonic nozzles to vary the effective capacity thereof.

References Cited in the file of this patent

UNITED STATES PATENTS

| | | |
|---|---|---|
| 2,618,125 | Fischer | Nov. 18, 1952 |
| 2,669,245 | Walker | Feb. 16, 1954 |
| 2,723,615 | Morris | Nov. 15, 1955 |